United States Patent Office 3,429,937
Patented Feb. 25, 1969

3,429,937
FLUOROCARBON DERIVATIVES OF PARAFFIN WAX
William D. Blackley, Wappingers Falls, and William R. Siegart and Harry Chafetz, Poughkeepsie, N.Y., assignors to Texaco Inc., New York, N.Y., a corporation of Delaware
No Drawing. Filed June 15, 1965, Ser. No. 464,187
U.S. Cl. 260—653.8    4 Claims
Int. Cl. C08h 9/06; C07c 19/08; C07b 9/00

ABSTRACT OF THE DISCLOSURE

A fluorinated macrocrystalline paraffin wax for coating solid surfaces of a molecular weight between 1000–3000, an elemental content of between 25–30 wt. percent C, between 65–75 wt. percent F, less than 1 wt. percent H and a melting point between 50–150° C., prepared by contacting macrocrystalline paraffin wax with fluorine in the presence of alkali metal fluoride and subjecting the resultant product to a specific sequential extraction.

---

This invention relates to novel fluorocarbons. More particularly, it pertains to specific fluorinated macrocrystalline paraffin waxes and method of manufacture. The invention further pertains to structures whose surfaces are coated with the novel fluorocarbons to render said surfaces outstandingly oil and water repellent and to a method of coating said structural surfaces.

The novel fluorinated macrocrystalline paraffin waxes of the invention are white colored solids of a melting point of between about 50 and 150° C. and a molecular weight between about 1000 and 3000. Structurally they are composed of saturated aliphatic carbon chains of between about 20 and 40 carbons wherein essentially all the non-carbon to carbon bonds are carbon to fluorine bonds with a very minor amount of carbon to hydrogen bonding. They are essentially straight chained with a minor amount, if any, of terminal branch chaining. The contemplated fluorinated waxes are further described as a product having a carbon content of between about 25 and 30 wt. percent, a fluorine content between about 65 and 75 wt. percent and a hydrogen content of less than about 1 wt. percent of a general empirical formula of $(C_7F_{13}H_2)_n$ where $n$ is an average integer about 4 and 8.

The fluorinated paraffin waxes of the invention are for the most part a mixture of compounds, and therefore the values set forth above are average values for the composite mixture rather than values for individual compounds.

The fluorinated paraffin wax is prepared by contacting macrocrystalline paraffin wax with gaseous fluorine in the presence of an alkali metal fluoride catalyst at a temperature between about 0 and 250° C. The resultant fluorinated product is subjected to a first extraction utilizing one or more solvents in the liquid state selected from the group consisting of carbon tetrachloride, chloroform, methylene dichloride, pentane, petroleum ether, ethyl acetate, acetic acid, benzene, acetone, diethylether, tetrahydrofuran, 1,4-dioxane, methyl alcohol, ethyl alcohol, and isopropyl alcohol.

After the first extraction, the solvent insoluble portion is recovered (e.g., via filtration) and subjected to a second extraction with a solvent in the liquid state selective for the fluorinated macrocrystalline paraffin wax product of the invention such as the haloperfluoro aliphatic and haloperfluoro aromatic hydrocarbons and haloperfluoro cyclic ethers having up to 25 carbons, for example, 1,2-dichloro - 1,1,2,2 - tetrafluoroethane, 1,1,2 - trichloro - 1,2,2-trifluoroethane; a perfluorocyclic ether (5 or 6 membered ring with the fluorinated side chain) with an empirical formula of $C_8F_{16}O$ having at least a 95 volume percent boiling range between 210–225° F. a refractive index at 77° F. of 1.274, a density at 77° F. of 1.77 ± 0.02 and sold by Minnesota Mining and Manufacturing Co. under the trade name FC–75, bromotrifluoromethane, trichlorofluoromethane, hexafluorobenzene, chloropentafluorobenzene, and dichlorotetrafluorobenzene. The second extract solution is separated from the haloperfluoro solvent insoluble material (e.g., via filtration), and the haloperfluoro solvent is removed from the separated extract solution (e.g., via distillation) leaving the fluorinated macrocrystalline paraffin wax of the invention as solid residue.

The first and second extractions are desirably conducted at room temperature (e.g. between about 20–30° C.) when possible but can be conducted between the freezing and boiling points of the extracted solvents contemplated. Further, the weight ratio of extracted solvent to material to be subject to extraction in the first and second extraction is desirably between about 1:1 and 10:1 although higher and lower ratios may be employed.

Under the most preferred conditions, solvents employed in their sequence of use are as follows: (1) successively extracting the crude fluorinated paraffin wax with chloroform at a temperature between about 25 and 60° C. and recovering the chloroform insoluble residue, (2) extracting the chloroform insoluble residue with 1,1,2-trichloro-1,2,2-trifluoroethane and recovering the resultant extract solution, and (3) subsequently distilling off the 1,1,2-trichloro-1,2,2-trifluoroethane leaving the fluorinated paraffin wax product of the invention.

The paraffin wax initial reactant from which the fluorinated paraffin wax products of the invention are derived is macrocrystalline in character, of a melting point between about 40 and 75° C. predominantly a straight chain saturated aliphatic hydrocarbon with a minor amount of branch chaining at and/or near the ends of the wax molecules having the empirical formula $C_nH_{2n+1}$ where $n$ averages between about 20 and 33 carbon atoms per molecule. A preferred paraffin wax reactant contains an average 25–30 carbon atoms per molecule. Further, the paraffin waxes are de-oiled, that is, having an oil content of less than 5%. The de-oiled paraffin waxes are obtained from distillate lubricating hydrocarbon oil fractions by solvent dewaxing or by pressing and sweating. The de-oiled paraffin waxes have a melting point of between about 45 and 65° C.

In the fluorination of the macrocrystalline paraffin wax the mole ratio of alkali metal cataylst to paraffin wax is advantageously between about 1:10 and 500:1 or even higher, preferably between about 50:1 and 100:1. For better control of fluorination, inert diluent gas is employed with fluorine, advantageously in an amount between about 5 and 75 volume percent of the gaseous fluorinating mixture. Specific examples of the inert diluent gas contemplated are nitrogen, helium, argon, xenon and neon.

Examples of the alkali metal fluoride catalysts contemplated herein are sodium fluoride, potassium fluoride, lithium fluoride, cesium fluoride and rubidium fluoride.

Under preferred fluorination conditions, the paraffin wax, alkali metal fluoride catalyst and combinations thereof are in a finely divided state during fluorination in order to facilitate the contact between the paraffin wax, catalyst and fluorine. Hereinbefore and hereinafter by the term "finely divided" we intend particles of an average diameter of less than about 1 mm. Under the most preferred conditions, the paraffin wax is present as a coating on the alkali metal fluoride catalyst during fluorination, e.g., of less than about 1 mm. thickness. This latter state is accomplished by dissolving the paraffin wax in a suitable solvent therefor, mixing insoluble alkali metal fluoride in the solvent solution and under agitation conditions, subsequently removing all the solvent by stardard means, e.g., distillation and then finely dividing, e.g., grinding the residual solids until a particle size of less than about 1 mm. average diameter is obtained. Examples of suitable solvents for dissolving paraffin wax are the chlorinated liquid aliphatic hydrocarbons, nitrated liquid aliphatic and aromatic hydrocarbons, liquid aromatic hydrocarbons and ketones, for example, chloroform, methylene dichloride, carbon tetrachloride, nitrobenzene, nitropropane, benzene, toluene, xylene, acetone and methylethylketone.

As previously stated, the fluorinated paraffin wax products of the invention form outstanding oil and water repellent coating on structural surfaces. Examples of structural surfaces contemplated are those of metal (e.g., steel, copper, brass), paper, sheetrock, plywood, leather, textile fibers (e.g., Dacron, nylon, cotton, rayon, rayon acetate, cotton and wool). It has been found particularly suitable for treating clothing materials to render them water and oil repellent. It has ben found to be superior to other fluorinated products such as fluorinated polystyrene and fluorinated durene.

The coating process is accomplished by standard means. One such means is first forming a solvent coating solution of the fluorinated paraffin wax. Advantageously the fluorinated wax comprises between 0.1 and 30 wt. percent of the coating solution, preferably between about 0.5 and 2 wt. percent for paper surfaces, between about 5 and 20 wt. percent for cloth surfaces and between about 1 and 25 wt. percent for wood and metal surfaces. Any of the aforementioned haloperfluoro solvents which are readily volatilizable (e.g., of a boiling point of less than about 100° C.) are suitable. Examples of particularly suitable solvents are trichlorotrifluoroethane (e.g.

$$CCl_2F—CClF_2)$$

1,2 - dichloro - 1,1,2,2 - tetrafluoroethane, chlorotrifluoromethane and FC-75. The method of application to the desired surfaces is accomplished by any standard means such as dipping, spraying (e.g., as an aerosol) or brushing the preformed solvent solution of the fluorinated paraffin wax on the surface permitting the volatilizable diluent to evaporate either at ambient or elevated temperature leaving the desired coating of the fluorinated paraffin wax on the treated surfaces. Coating thicknesses may vary widely depending on the materials to be coated and the use of the material. However, thicknesses of less than about 1 mm., preferably of between about $10^{-5}$ and 0.1 mm. are commonly employed. Alternatively, the fluorinated paraffin wax may also be applied to the structural surfaces by first melting the fluorinated wax and applying the molten product to the desired surface by brushing, spraying and dipping and subsequently permitting it to solidify by cooling to form the desired coating.

One advantage of the fluorinated paraffin wax product of the invention as a coating over paraffin waxes which are coated on surfaces and then subsequently fluorinated is found in the fact that since fluorine is very reactive great care has to be taken in completely coating the surface to be exposed to the fluorine with the paraffin wax before fluorination. Further, because of the highly active nature of fluorine, fluorination has to be conducted in a closed area and if the structure to be coated and fluorinated is of the unique or large design the enclosing container often is costly. These two undesirable features are eliminated by the use of the relatively low melting solvent soluble fluorinated paraffin wax of the invention.

The following examples further illustrate the invention but are not to be considered limitations thereof:

EXAMPLE I

This example illustrates the preparation of a species of the fluorinated paraffin wax of the invention.

In 250 ccs. of carbon tetrachloride there was dissolved 43.8 grams of paraffin wax having a molecular weight of 392 and a melting point of 50° C. The resultant solution was slurried with 305 grams of finely divided sodium fluoride and the carbon tetrachloride was subsequently removed by distillation at 80° C. under 760 mm. Hg under agitation and a solid which was essentially wax coating sodium fluoride particles remained. The resultant solid was subjected to grinding so that the final particles were of an average diameter of less than 1 mm. and were essentially sodium fluoride particles coated with the paraffin wax. The powdered wax coated sodium fluoride particles were charged to a metal fluorinator and a mixture of fluorine and nitrogen was introduced therethrough respectively at a rate of 20 and 100 ccs./min. The effluent gases were passed through a Dry Ice cooled trap to remove volatile fluorinated products. The amount of fluorine added was 7.6 moles, the reaction time was 73 hours and the temperature maintained for most of the reaction period was between 40–45° C. but a maximum temperature of 90° C. was reached. The solids in the fluorinator registered a weight gain of 195 grams.

The fluorinated wax was removed from the fluorinator and 544 grams were extracted with 500 mls. of chloroform at 40–60° C. The chloroform extract solution was removed from the chloroform insoluble material by filtration. The chloroform insoluble residue was then subjected to extraction with 1000 mls. of 1,1,2-trichloro-1,2,2-trifluoroethane at 48° C. The trichlorotrifluoroethane extract solution was recovered from the solvent insoluble residue by filtration and the trichlorotrifluoroethane was removed by distillation leaving 35.9 grams of a white colored solid having a melting point of 66–70° C. Analysis of this solid determined it to have an average molecular weight of 1789 and an elemental analysis of 25.8 wt. percent carbon, 73.6 wt. percent fluorine and 0.6 wt. percent hydrogen. Infrared analysis indicated that it was almost a completely fluorinated product in that it showed weak carbon-hydrogen bonds and strong carbon-fluorine bonds. The fluorinated paraffin wax was further determined to be a mixture of essentially straight chain aliphatic compounds with an average empirical formula of $$(C_7F_{13}H_2)_n$$

where $n=5.43$.

EXAMPLE II

This example illustrates the outstanding oil and water repellent properties of the fluorinated macrocrystalline paraffin wax of the invention when coating cloth and paper surfaces. The tests employed were the Minnesota Mining and Manufacturing Oil Repellency Test and the Dupont Oleophobic Test. These tests comprise placing 2 separate drops of mineral oil of 360/390 SUS at 100° F. on material to be tested of 2" x 2" dimensions, e.g., paper or cloth positioned horizontally on a blotter. Water was also substituted for oil. The extent of the surface wetting is determined visually within 10 seconds of placing the drops. A rating of 150 (3M) and 9 (Dupont) is the rating given for no wetting of the surface and 0 for complete wetting. The standards for determining the oleophobic rating in the 3M test are found in "Fluorine Chemistry" by J. H. Simons, vol. 5, p. 403, Academic Press, New York, 1964. The Dupont test standards are as follows:

Dupont standards

| Hydrocarbon: | Oleophobic rating No. |
|---|---|
| n-Heptane | 9 |
| n-Octane | 8 |
| n-Decane | 7 |
| n-Dodecane | 6 |
| n-Tetradecane | 5 |
| 1:1 Mixture of mineral oil (360/390 SUS at 100° F.)+n-hexadecane | 4 |
| 3:1 mixture of mineral oil+n-hexadecane | 3 |
| Mineral oil | 2 |
| Mineral oil wets | 0 |

It is to be noted complete wetting is determined by the absence of light reflectivity at the material-drop interface and as the light reflectivity increases the wetting decreases. Light weight porous fabrics are mounted on an embroidery hoop rather than laid horizontally on a blotter to avoid capillary effects from the blotting paper.

The aforedescribed tests were applied to paper and cloth strips utilizing the fluorinated paraffin wax of product of Example I as the test coating and as comparison fluorinated polystyrene of the empirical formula $$(C_{16}H_4F_{25})_n$$

where $n$ was an average integer between 3 and 4 prepared in a manner similar to Example I and fluorinated durene of the empirical formula $(C_{16}H_4F_{25})_n$ where $n$ is an average integer of 3 also prepared in the manner of Example I. The repellent coatings were applied to the cotton cloth and paper surfaces by dissolving the fluorinated product in 1,2,2-trichloro-1,1,2-trifluoroethane and immersing the cloth and paper strips in the resultant solution and subsequently evaporating off the polyhaloethane leaving the fluorinated coating on the cloth or paper surface. Solutions of varying repellency agent concentrations in which the material to be treated was dipped were employed in order that varying coating thicknesses could be tested. In the Blanks the cloth and paper were dipped in undiluted trichlorotrifluoroethane. The test results are reported in the tables below and a key to the terminology found therein is as follows:

(a) FPS=Fluorinated Polystyrene
(b) FW=Wax
(c) FD=Fluorinated Durene
(d) Uptake of FC (W/W)=Weight percent of Fluorinated Compound on the surface of the material which was coated divided by weight of material×100.

TABLE I.—REPELLENCY EFFECT OF FW, FD, AND FPS WHEN COATING COTTON CLOTH IN VARYING AMOUNTS

| Fluorinated Material | Percent Uptake FC (W/W) | Repellency Rating | | |
|---|---|---|---|---|
| | | Water | 3M Oil | Dupont Oil |
| Blank | 0 | None | 0 | 0 |
| FW | 0.4 | Good | 0 | 0 |
| FD | 0.4 | None | 0 | 0 |
| FPS | 0.4 | Slight | 0 | 0 |
| FW | 1.5 | Good | 80 | 4 |
| FD | 1.7 | do | 0 | 2 |
| FPS | 1.9 | do | 0 | 0 |
| FW | 9 | do | 90 | 6 |
| FD | 9 | do | 50 | 4 |
| FPS | 9 | do | 0 | 2 |
| FW | 17 | do | 90 | 6 |
| FD | 19 | do | 70 | 4 |
| FPS | 17 | do | 50 | 4 |

TABLE II.—REPELLENCY EFFECT OF FW, FD AND FPS WHEN COATING PAPER IN VARYING AMOUNTS

| Fluorinated Material | Percent Uptake FC (W/W) | Repellency Rating | | |
|---|---|---|---|---|
| | | Water | 3M Oil | Dupont Oil |
| Blank | 0 | None | 0 | 0 |
| FW | 0.4 | Good | 0 | 0 |
| FD | 0.4 | None | 0 | 0 |
| FPS | 0.4 | Good | 0 | 0 |
| FW | 1.7 | do | 50-80 | 4-5 |
| FD | 2 | Fair | 70 | 4 |
| FPS | 1.3 | Good | 70 | 4 |
| FW | 9 | do | 100 | 7 |
| FD | 9 | do | 90 | 5 |
| FPS | 9 | do | 80 | 4 |
| FW | 17 | do | 110 | 7 |
| FD | 19 | do | 90 | 6 |
| FPS | 19 | do | 80 | 5 |

As can be seen, the fluorinated paraffin wax of the invention is superior in the foregoing tests to fluorinated durene and fluorinated polystyrene when functioning as an oil and water repellent coating. Further, the above tables demonstrate that fluorinated paraffin wax is an outstanding oil and water repellent coating.

EXAMPLE III

This example further illustrates the oil and water repellency of the fluorinated paraffin wax of the invention.

The fluorinated paraffin wax and comparative fluorinated durene and fluorinated polystyrene described in Example II were subjected to further Dupont Oil Repellency and 3M Oil Repellency tests and were also subjected to the ASTM Water Spray Test (ASTM D–583).

In the ASTM test water was sprayed against the surface of a test specimen under controlled conditions and produces a wetting pattern indicative of the relative repellency or resistance to external wetting of the fabric. The fabric is rated by comparing its wetted pattern with pictures on a standard rating chart. A rating of 80 (wetting of upper surface at spray points) is considered passing. No wetting at all is given a rating of 100.

Results of the ASTM Spray Test, 3M Oleophobic Test and Dupont Oleophobic Test on cotton cloth treated with FPS, FD and FW described in Example II are shown in subsequent Table III. By some standards an acceptable oil repellency rating is 70 for the 3M and 4 for the Dupont, however, these ratings are not necessary to obtain an acceptable product.

The FPS treated cloth did not pass the ASTM Spray Test but passed the 3M and Dupont oil test at 23.2% Uptake with ratings of 70 and 4. The FD treated cloth also did not pass the ASTM Spray Test but passed the oil at 25% Uptake with ratings of 80 and 4. The FW treated cloth gave the best performance, passing the ASTM Spray Test with a rating of 90 and the 3M and Dupont Oil Tests with ratings of 80 and 4. This was achieved with an Uptake of 3.6%.

TABLE III.—RESULTS OF WATER AND OIL REPELLENCY TESTS ON TREATED CLOTH

A. Fluorinated Polystyrene

| Percent Uptake FC (W/W) | ASTM Spray Rating | 3M Oil | Dupont Oil |
|---|---|---|---|
| 4.0 | 50 | 0 | 0 |
| 7.8 | 50 | 70 | 3 |
| 23.2 | 50 | 70 | 4 |

B. Fluorinated Durene

| 3.8 | 70 | 0 | 0 |
|---|---|---|---|
| 9.5 | 70 | 50 | 2 |
| 25.0 | 70 | 80 | 4 |

C. Fluorinated Wax

| 3.6 | 90 | 80 | 4 |
|---|---|---|---|
| 9.4 | 100 | 90 | 6 |

We claim:
1. A fluorinated macrocrystalline paraffin wax of a molecular weight of between about 1000 and 3000, a carbon content between about 25 and 30 wt. percent, a fluorine content between about 65 and 75 wt. percent, a hydrogen content of less than about 1 wt. percent and a melting point between about 50 and 150° C.

2. A method of preparing a fluorinated paraffin wax having a molecular weight between about 1000 and 3000 a melting point between about 50 and 150° C. and an elemental content of between about 25 and 30 wt. percent carbon, between about 65 and 75 wt. percent fluorine and less than about 1 wt. percent hydrogen, comprising contacting a macrocrystalline paraffin wax having between about 20 and 33 carbon atoms and of a melting point of between about 40 and 75° C. with a gaseous agent comprising fluorine in the presence of alkali metal fluoride catalyst at a temperature between about 0 and 250° C. and then subjecting the resultant solid product to a first solvent treatment comprising first extracting the resultant mixture with at least one first solvent selected from the group consisting of carbon tetrachloride, chloroform, methylene dichloride, pentane, petroleum ether, ethyl acetate, acetic acid, benzene, acetone, diethylether, tetrahydrofuran, 1,4-dioxane, methyl alcohol, ethyl alcohol, and isopropyl alcohol, separating the resultant first solvent solution from the first solvent insoluble material subsequently subjecting said first solvent insoluble material to a second extraction treatment comprising extracting said first solvent insoluble material with a second solvent selected from the group consisting of haloperfluorohydrocarbon solvent and haloperfluoroether of less than 25 carbons, separating the resultant second solution from the second solvent hydrocarbon insoluble material and separating said second solvent from said resultant second solution leaving said fluorinated paraffin wax as residue.

3. A method in accordance with claim 2 wherein said gaseous mixture also comprises between about 25 and 95 volume percent inert diluent gas based on said gaseous mixture, the mole ratio of said alkali metal catalyst to said paraffin wax of about 1:10 and 500:1 wherein said paraffin wax is present during fluorination primarily as a coating on said catalyst, the coated catalyst having an average particle size of less than 1 mm. diameter and wherein said first solvent treatment comprises an extraction with chloroform and said second solvent treatment comprises extraction with 1,1,2-trichloro-1,2,2-trifluoroethane.

4. A fluorinated macrocrystalline paraffin wax having a molecular weight of 1789, a melting point between 66–70° C., a carbon content of 25.8 wt. percent, a fluorine content of 73.6 wt. percent and a hydrogen content of 0.6 wt. percent.

References Cited
UNITED STATES PATENTS 2,122,278   6/1938   Clark _____ 260—653

DANIEL D. HORWITZ, *Primary Examiner.*

U.S. Cl. X.R.

117—168, 158, 135, 149, 142, 138.8, 143, 144; 106—271; 208—27